Oct. 22, 1968  G. K. NEWELL  3,406,943

ROTARY VALVE DEVICE WITH COACTING CAMMING SURFACES

Filed Sept. 29, 1965

INVENTOR.
GEORGE K. NEWELL

BY Donald P. Rooney

AGENT

United States Patent Office 3,406,943
Patented Oct. 22, 1968

3,406,943
ROTARY VALVE DEVICE WITH COACTING
CAMMING SURFACES
George K. Newell, Level Green, Pa., assignor to Westinghouse Air Brake Company, Wilmerding, Pa., a corporation of Pennsylvania
Filed Sept. 29, 1965, Ser. No. 491,203
8 Claims. (Cl. 251—163)

ABSTRACT OF THE DISCLOSURE

A valve device comprising a housing and a rotatable valve member having a stem carrying two back-to-back oppositely biased mushroom shaped valve elements adapted to seat on adjacent, respective, annular seat means to control flow of fluid through the housing. Each of the valve elements includes two coaxial spherical surfaces having different radii of curvature. The inner spherical surface contacts the inner wall of the housing as the valve member is rotated within the housing thereby camming the outer surface of the valve element away from the inner wall and insuring that the outer surface of the valve element contacts only the adjacent respective seating means.

Figure 1:
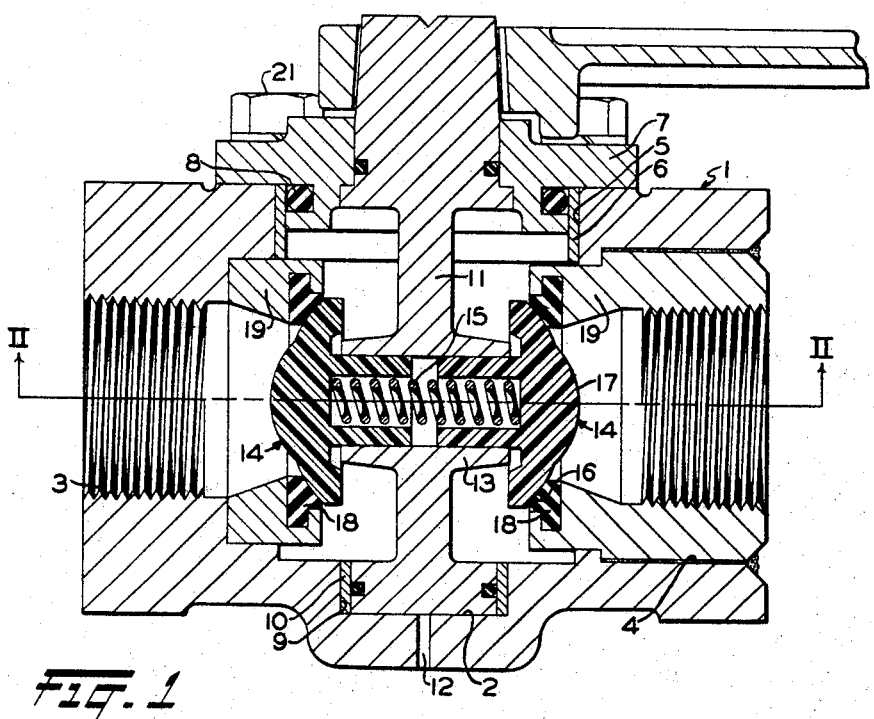

According to the existing well-known construction of angle and cut-out cocks, the valve member is customarily made as a tapered cylindrical member seated on a correspondingly tapered seat in the cock body, to which it is lapped or ground, and has an aperture therethrough which is aligned with or transverse to the flow passage through the cock as the valve member is turned to control flow of fluid through the cock device.

This type of angle or cut-out cock device is reliable and has a satisfactory service life. However, it requires skillful workmanship to manufacture, particularly to effect the necessary lapping or grinding in of the valve member to the seat per se. In consequence, the existing type of angle or cut-out cock device is a relatively high cost item, and various proposals have been made, for a number of years, in an attempt to provide a relatively low cost valve device which can be serviced by relatively unskilled personnel in the field and which has a longer service life than existing angle and cut-out cock devices.

For example, it has been proposed to modify the existing valve member and valve body by providing spring loaded sealing means in the valve member or the valve body. Thus far, no design has been arrived at which is more satisfactory so far as service life and cost of production are concerned. Moreover, so far as known, no modification of existing angle cocks or cut-out cocks has been proposed which both provides maximum sealing and minimum attrition to the valve member and seat per se.

It is accordingly the object of the present invention to provide a new design of angle or cut-out cock device, utilizable, for example, in the brake pipe system of railway cars and trains, which is relatively simple in construction and low in cost, which enables servicing by relatively unskilled personnel in the field without detachment from the piping system and which at the same time provides a maximum sealing between the spring loaded valve means and its respective seat and a minimum wear between a spring loaded valve means where it contacts the valve seat.

According to the invention, there is provided an angle or a cut-out cock having an integrally formed cock body in which two aligned oppostiely facing mushroom-shaped valve elements are carried slidably in a hub formed on the valve stem inside the cock body, and spring-loaded in opposite directions. Each of the valve elements has a curved spherical face having an outer area of one radius of curvature and a central portion of another radius of curvature. The outer area of the valve element contacts only the valve seat while the central portion of each valve element is used as a cam follower member which engages the circular walls of the bore within the cock body acting as a cam member to raise the outer area of the valve out of contact with the seat and bore. When the valve stem is turned to its valve closing position, fluid under pressure overcomes the spring force and flows past one valve element, depending on the predetermined pressure, into the valve chamber and acts on the back or inner surface of the other valve element thus assisting the spring force and seating the valve element tighter on its respective seat at the exit port of the cock. The advantages of the invention are: (1) substantially friction-free valve seat faces, (2) additional positive seating and sealing of the valve element when closed proportional to the variance in fluid pressure, (3) easy assembly and disassembly by relatively unskilled personnel.

Figure 2:
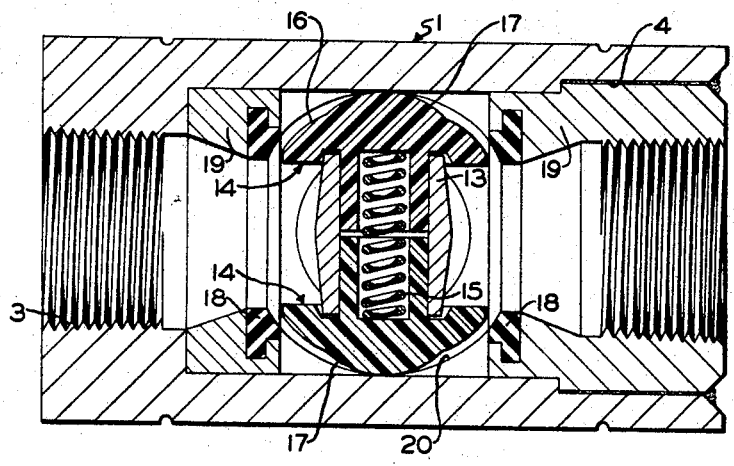

In the accompanying drawings:
FIG. 1 is a sectional view of the angle cock with the handle and the valve means in a closed position.
FIG. 2 is a longitudinal cross-sectional view taken along lines II—II of FIG. 1, but showing the valve means in a fully open position.

Referring now to the drawings, the valve device shown comprises a cock body or housing 1 having a central through-bore 2 threaded at one end 3, and counterbored at the other end 4. A second bore 5 is perpendicular to and intersects the first bore at approximately its midpoint and has a friction fitted sleeve liner or bushing 6 at its outer end and an annular cap 7 having an annular groove containing an O-ring 8 which seals against the sleeve liner 6. Cap member 7 has a central bore and opposite from said central bore is a counterbore which has a bearing or liner 10 friction fitted therein.

A valve stem 11 is sealingly fitted for turning inside the bearing 10 and the central bore of cap 7 through which the outer end of the stem projects and to which a suitable handle is secured. The lower end of valve stem 11 is exposed to atmospheric pressure through a port 12, thereby effecting a pressure balance on the stem. Conventional sealing O-rings are disposed between the stem 11, cap 7 and the liner 10 which seals the pressure inside the cock body against leakage along the stem. Between the bearing points of the stem 11 is a hub portion 13 in which oppositely facing mushroom-shaped valve elements 14 are slidably mounted.

Valve elements 14 are identical in construction and may be made of a suitable material such as any commercially available plastic type compound. Each valve element comprises a hollow stem portion slidable in the bore of hub 13 with spherical valve surfaces at the other end thereof; these spherical valve surfaces take on the appearance of the head of a mushroom.

A coil spring 15 is fitted under compression inside the hollow stem portion of valve elements 14. Coil spring 15 thus acts to bias valve elements in opposite directions and to yieldably resist inward sliding movement of both valve elements within the bore of hub 13. Valve elements 14 are made in such a way that the outer or sealing area 16 thereof is a section of a spherical surface having one radius of curvature and the central inner area 17 has a spherical surface having a radius of curvature different than that of the outer area, illustrated, in the instant case, as a smaller radius of curvature.

The outer area of each valve element contacts a corresponding respective annular seat 18 when the valve is in a closed position. The inner area contacts seat 18 and the inner surface of the bore 5 when the valve is turned between the open and closed position due to the force of spring 15 which urges the valve elements radially outwardly. Seats 18 are made of a suitable material such as a rubber composition; they are L-shaped in cross-section and are seated in an annular groove in a valve seat rings 19 which in turn are press-fitted or cemented in a counterbore of bore 3 and in bore 4 respectively.

In the operation of the cock means, let it be assumed that the valve stem is turned through an angle of 90° by the handle from a position shown in FIG. 1 to the position shown in FIG. 2 which is from full closed to full open position. As the valve is rotated initially, the aforementioned sealing areas 16 of each valve surface move inwardly away from their respective seats 18 due to the central area 17 of each valve surface acting as a cam follower riding over its corresponding seat 18 and contacting the wall surface 20 of the bore 5 which acts as a stationary cam. Throughout this rotation the sealing areas 16 have not been exposed to any frictional attrition whatsoever, because of the areas 17 being in fractional contact with the surface 20 of bore 5 and seats 18 at all times during this turning. The areas 17 cross over seats 18 without damage to the seats, since the seats are made of a material such as rubber which is not affected by the soft plastic material of the valve elements 14.

When the valve stem is returned to closed position, that is, from the position shown in FIG. 2 to the position shown in FIG. 1, the central area 17 of each valve element 14 rides on the surface 20 of the bore 5 and over the corresponding seat 18 into the seat's open center. Sealing area 16 now contacts the seat 18 and is held tightly there in sealing position due to the compression force of spring 15.

With the valve in closed position, the fluid pressure on the high pressure side of the cock unseats its respective valve element 14 against the force of spring 15 and thus fluid flows around hub 13 and exerts pressure against the back side of the opposite valve element 14 to hold it tighter against its respective seat 18 thus assuring a more positive seal directly proportional to the fluid pressure.

If at any time the plastic type valves or their respective rubber seats become scuffed or defective, they can be readily removed and replaced in the field by persons of little or no skill. This is done by placing the valve in its open position, as shown in FIG. 2, undoing the conventional studs 21 which secure cap 7 to the cock body and then lifting the entire stem, hub and cap members from the cock body. After the defective part is replaced, the valve stem is then reassembled and reinstalled in reverse order.

Although a specific embodiment of the invention has been shown and described, it is with full awareness that other modifications thereof are possible.

Having now described the invention, what I claim as new and desire to secure by Letters Patent is:

1. A valve means comprising a face means and a stem means,
    (a) said face means having a convex outer surface and an inner surface,
    (b) said stem means being connected to said inner surface,
    (c) said outer surface having two coaxial spherical areas each of which has a different radius of curvature.
2. The valve means of claim 1 wherein said stem means consists of a cylindrically shaped tube.
3. The valve means of claim 2 wherein said valve means is made of a plastic or synthetic polymer type material.
4. A valve device comprising:
    (a) a housing having a through passageway therein and a bore intersecting said passageway,
    (b) seat means on the housing surrounding the said passageway at its intersection with said bore,
    (c) a stem rotatable in said bore and having a hub with a through bore therein,
    (d) a pair of valve elements slidably carried within the bore in said hub and biased in opposite directions, each of said valve elements comprising a head portion and a tubular valve stem portion, said head portion having an outer spherical seating surface of one radius of curvature and a coaxial inner spherical surface of a different radius of curvature and the said valve stem portion being slidable within the bore of said hub, said coaxial inner spherical surface being in alignment with said passageway in one position of said hub in which said outer spherical seating surface is in contact with said seat means to stop flow of fluid through said passageway, said coaxial inner surface contacting the wall of said bore in another position of said hub and cammed inwardly by contacting the said wall to a position in which said outer spherical seating surface is held out of contact with the said seat means and the wall of the bore.
5. A valve device as claimed in claim 4, further characterized by resilient means interposed in the bore of said hub between the stems of said valve elements for biasing them in opposite directions.
6. The valve device of claim 4 wherein said seat means comprises annular sealing means removably secured to the housing disposed at the intersection of said passageway and said bore, on which the outer spherical surface of said valve elements are adapted to seat.
7. The valve device as claimed in claim 6 wherein said valve elements are of a plastic material and said annular sealing means are of a rubber material.
8. A valve device comprising:
    (a) housing having a through passageway therein and a bottom bore intersecting said passageway,
    (b) seat means on the housing surrounding the said passageway at its intersection with said bore,
    (c) a stem rotatable in said bottom bore and having a hub with a bore therein,
    (d) a valve element slidably carried within the bore in said hub and biased in an outward direction, said valve element comprising a head portion and a tubular valve stem portion, said head portion having an outer spherical seating surface of one radius of curvature and a coaxial inner spherical surface of a different radius of curvature and the said valve stem portion being slidable within the bore of said hub, said coaxial inner spherical surface being in alignment with said passageway in one position of said hub in which said outer spherical seating surface is in contact with said seat means to stop flow of fluid through said passageway, said coaxial inner surface contacting the wall of said bore in another position of said hub and cammed inwardly by contacting the said wall to a position in which said outer spherical seating surface is held out of contact with said seat means and the wall of the bore.

References Cited

UNITED STATES PATENTS

| 1,081,322 | 12/1913 | Murphy | 251—182 |
| 1,849,802 | 3/1932 | Moulet. | |
| 2,015,849 | 10/1935 | Hardies | 251—182 |
| 2,274,731 | 3/1942 | Parker | 251—182 |

FOREIGN PATENTS

| 400,078 | 3/1909 | France. |
| 650,823 | 10/1928 | France. |

CLARENCE R. GORDON, *Primary Examiner.*